US012805586B2

(12) United States Patent
Gordon et al.

(10) Patent No.: US 12,805,586 B2
(45) Date of Patent: Nov. 24, 2026

(54) SHEETROCK-CUTTING FINGER PROTECTION DEVICE

(71) Applicants: Davion Gordon, Watervliet, NY (US); Chad Gordon, Watervliet, NY (US)

(72) Inventors: Davion Gordon, Watervliet, NY (US); Chad Gordon, Watervliet, NY (US)

(*) Notice: Subject to any disclaimer, the term of this patent is extended or adjusted under 35 U.S.C. 154(b) by 0 days.

(21) Appl. No.: 19/295,765

(22) Filed: Aug. 11, 2025

(65) Prior Publication Data

US 2026/0223964 A1 Aug. 6, 2026

Related U.S. Application Data

(60) Provisional application No. 63/751,366, filed on Jan. 30, 2025.

(51) Int. Cl.
*A41D 13/08* (2006.01)
*B25H 7/04* (2006.01)

(52) U.S. Cl.
CPC ............. *A41D 13/087* (2013.01); *B25H 7/04* (2013.01)

(58) Field of Classification Search
CPC .................................................... A41D 13/087
USPC ................................................................. 2/21
See application file for complete search history.

(56) References Cited

U.S. PATENT DOCUMENTS

| | | | | |
|---|---|---|---|---|
| 5,450,626 | A | 9/1995 | Sorrels | |
| 5,647,063 | A | 7/1997 | Bates | |
| 6,012,165 | A * | 1/2000 | Cain | A41D 13/087 2/21 |
| 6,038,697 | A | 3/2000 | Kasarnich | |
| 6,944,961 | B2 | 9/2005 | Carroll | |
| 9,161,578 | B1 * | 10/2015 | Andreasen | G01B 3/10 |
| 2005/0044734 | A1 * | 3/2005 | Carroll | B43L 13/02 33/42 |
| 2020/0130212 | A1 * | 4/2020 | Mantello | A41D 13/087 |
| 2021/0030084 | A1 * | 2/2021 | Deetjen | A41D 13/087 |

* cited by examiner

*Primary Examiner* — Gloria M Hale
(74) *Attorney, Agent, or Firm* — Brennan, Manna & Diamond, LLC

(57) ABSTRACT

A sheetrock-cutting finger protection device is provided. The device is comprised of a body configured to receive at least one human finger through a longitudinal opening. An extension member is integrally or modularly formed with the main body and projects outwardly at an angle from the body, preferably 90 degrees relative to the longitudinal axis of the body. The extension member includes a bottom surface comprising at least one movement element such as rollers, sliders, or omni-wheels, which are mounted within recessed channels to enable smooth gliding of the device over work surfaces.

15 Claims, 4 Drawing Sheets

SHEETROCK-CUTTING FINGER PROTECTION DEVICE

CROSS-REFERENCE TO RELATED APPLICATION

The present application claims priority to, and the benefit of, U.S. Provisional Application No. 63/751,366, which was filed on Jan. 30, 2025, and is incorporated herein by reference in its entirety.

FIELD OF THE INVENTION

The present invention relates generally to the field of construction. More specifically, the present invention relates to a device configured to receive at least one human finger through a longitudinal opening and an extension member projecting outwardly at an angle from the body. The extension member includes a bottom surface with movement elements such as rollers, sliders, or omni-wheels mounted within recessed channels to enable smooth gliding over work surfaces. Accordingly, the present disclosure makes specific reference thereto. Nonetheless, it is to be appreciated that aspects of the present invention are also equally applicable to other like applications, devices, and methods of manufacture.

BACKGROUND

In construction environments, particularly during drywall or sheetrock installation, professionals are frequently required to measure, mark, and cut sheetrock with high precision and consistency. A common technique involves using the index finger to maintain contact along the edge of the sheetrock while guiding measuring tools or marking instruments. This repeated contact with the abrasive sheetrock surface often leads to skin irritation, abrasions, and discomfort over time. Even when gloves are worn for protection, they tend to wear out quickly at the index finger area, creating holes that diminish their effectiveness and necessitate frequent replacement. These conditions disrupt workflow and reduce productivity, as workers must often stop to address finger pain or replace damaged gloves. This issue is particularly acute in high-volume settings where speed and accuracy are essential. Traditional protective gear fails to adequately address this specific contact point while preserving tactile function and tool maneuverability.

Therefore, there exists a long-felt need in the art for a sheetrock-cutting finger protection device that prevents direct contact between the index finger and abrasive sheetrock surfaces. There also exists a long-felt need in the art for a sheetrock-cutting finger protection device that allows smooth and continuous movement along sheetrock edges during measurement and cutting operations. Moreover, there exists a long-felt need in the art for a sheetrock-cutting finger protection device that provides ergonomic protection without interfering with tool usage or manual dexterity.

The subject matter disclosed and claimed herein, in one embodiment thereof, comprises a sheetrock-cutting finger protection device. The device is comprised of a body configured to receive at least one human finger through a longitudinal opening. An extension member is integrally or modularly formed with the main body and projects outwardly at an angle from the body, preferably 90 degrees relative to the longitudinal axis of the body. The extension member includes a bottom surface comprising at least one movement element, such as rollers, sliders, or omni-wheels, which are mounted within recessed channels to enable smooth gliding of the device over work surfaces.

In this manner, the sheetrock-cutting finger protection device of the present invention accomplishes all the foregoing objectives and provides a device that shields a user's finger from abrasions and irritation during prolonged contact with sheetrock, enabling smooth and uninterrupted movement via rotatable movement elements. More specifically, the device reduces wear on gloves, limits work stoppages due to finger discomfort, and improves precision and efficiency in sheetrock and other similar operations. By combining protective, ergonomic, and task-enhancing features into a single unit, the device provides a targeted solution to a long-standing problem encountered in drywall and construction tasks.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a sheetrock-cutting finger protection device. The device is a protective finger-worn apparatus designed for shielding a user's finger from mechanical abrasion, pressure, and friction in abrasive environments such as construction sites. The device enhances precision during tasks like measuring, marking, scoring, or cutting by facilitating continuous and stable surface contact with tools and materials.

The device is comprised of a main body shaped to conform to the contours of at least one human finger. The body includes a longitudinal opening for finger insertion. The interior surface of the longitudinal opening may include a padding layer comprised of impact-absorbing or friction-reducing materials such as closed-cell foam or gel inserts. The interior may also feature a textured surface designed to enhance grip, manage perspiration, or improve tactile feedback. Ventilation openings may be incorporated to promote airflow and reduce moisture buildup during prolonged use.

An extension member may be integrally or modularly connected to the main body, projecting outward at angles ranging from 1 to 179 degrees to accommodate various ergonomic or task-specific configurations. This extension member may be comprised of the same or different material as the main body. The bottom surface of the extension member includes at least one movement element that enables gliding or rolling across a surface. These movement elements, such as bearings or rollers, may be mounted in recessed channels and oriented parallel to each other for improved navigation and reduced friction.

A receiving area may be included in the body or extension member and is designed to stabilize commonly used construction tools like tape measures or pencils, enhancing measurement accuracy and reducing repositioning effort.

The invention also includes a method of use. A user inserts a finger into the longitudinal opening of the body and bends the finger to position the extension member along the edge of a board. While holding a tape measure in the same hand and a pencil in the opposite hand, the user slides the device laterally along the board. The movement elements facilitate a smooth glide, allowing a precise mark to be made across the board with consistent guidance.

Accordingly, the sheetrock-cutting finger protection device of the present invention is particularly advantageous as it provides a device that shields a user's finger from abrasions and irritation during prolonged contact with sheetrock, enabling smooth and uninterrupted movement via rotatable movement elements. More specifically, the device reduces wear on gloves, limits work stoppages due to finger discomfort, and improves precision and efficiency in sheetrock and other similar operations. By combining protective, ergonomic, and task-enhancing features into a single unit, the device provides a targeted solution to a long-standing problem encountered in drywall and construction tasks that overcomes the limitations of existing devices and methods known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
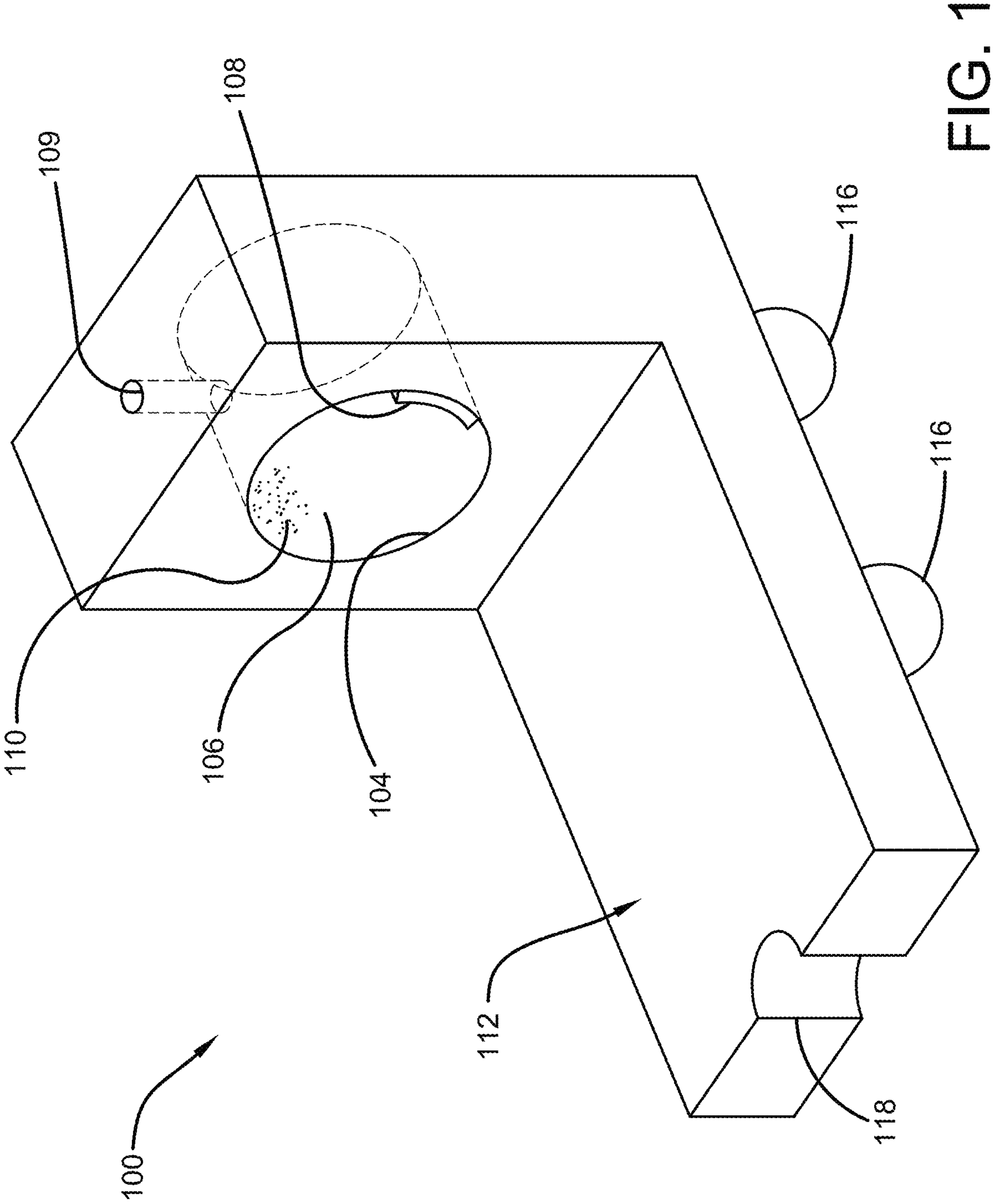
FIG. 1 illustrates a perspective view of one potential embodiment of a sheetrock-cutting finger protection device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a sheetrock-cutting finger protection device that prevents direct contact between the index finger and abrasive sheetrock surfaces. There also exists a long-felt need in the art for a sheetrock-cutting finger protection device that allows smooth and continuous movement along sheetrock edges during measurement and cutting operations. Moreover, there exists a long-felt need in the art for a sheetrock-cutting finger protection device that provides ergonomic protection without interfering with tool usage or manual dexterity.

The present invention, in one exemplary embodiment, is comprised of a sheetrock-cutting finger protection device. The device is configured to shield a user's finger from pressure, mechanical abrasion, and friction commonly encountered in abrasive environments such as construction sites during tasks such as measuring, marking, scoring, or cutting is improved by enabling stable and continuous contact with surfaces and tools.

A main body of the device features a longitudinal opening to allow finger insertion. Within the opening, a padding layer may be included, comprised of friction-reducing or impact-absorbing materials such as closed-cell foam or gel inserts. Additionally, the interior surface may be textured to increase tactile feedback, enhance grip, or control perspiration. To minimize moisture accumulation during extended use, ventilation openings may also be integrated.

An extension member, either integrally or modularly formed with the main body, may project outward at any angle between 1 and 179 degrees to suit various ergonomic and task-specific needs. This extension member may be fabricated from the same or a different material than the main body. The bottom surface of the extension member features at least one movement element designed to roll or glide along a surface. These movement elements, such as rollers or bearings, may be mounted within recessed channels and aligned parallel to one another to optimize directional control and minimize friction. A receiving area may be incorporated into either the body or the extension member and is designed to secure common construction tools, such as pencils or tape measures, thereby increasing accuracy and reducing the need for repositioning during use.

The invention further includes a method of operation. First, a user inserts a finger through the longitudinal opening of the body and bends the finger to align the extension member along the edge of a board. While holding a tape measure in the same hand and a pencil in the opposite hand, the user moves the device laterally along the board's edge. The movement elements allow the device to glide smoothly, enabling a straight and accurate mark to be made with consistent guidance.

As a result, the sheetrock-cutting finger protection device provides a specialized advantage by protecting a user's finger from irritation and abrasion during extended contact with materials like sheetrock. The incorporation of rotatable movement elements enables fluid, uninterrupted motion. The device further reduces glove wear, prevents work interruptions due to finger discomfort, and enhances both precision and efficiency in operations involving sheetrock and similar materials. By integrating protective, ergonomic, and task-enhancing functions, the device addresses long-standing challenges in drywall and construction tasks more effectively than conventional solutions.

Referring initially to the drawings, FIG. 1 illustrates a perspective view of one potential embodiment of a sheetrock-cutting finger protection device 100 of the present invention in accordance with the disclosed architecture. The device 100 is a protective finger-worn device designed for use in construction and other abrasive environments. The primary function of the device 100 is to shield a user's finger, such as, but not limited to, an index finger, from friction, pressure, and mechanical abrasion arising from extended contact with coarse or irregular surfaces such as, but not limited to, sheetrock, cement board, plywood, masonry board, etc. The device 100 also facilitates smoother engagement with tools and enhances user precision by enabling stable, continuous surface contact during measurement, marking, scoring, or cutting operations.

Figure 3:
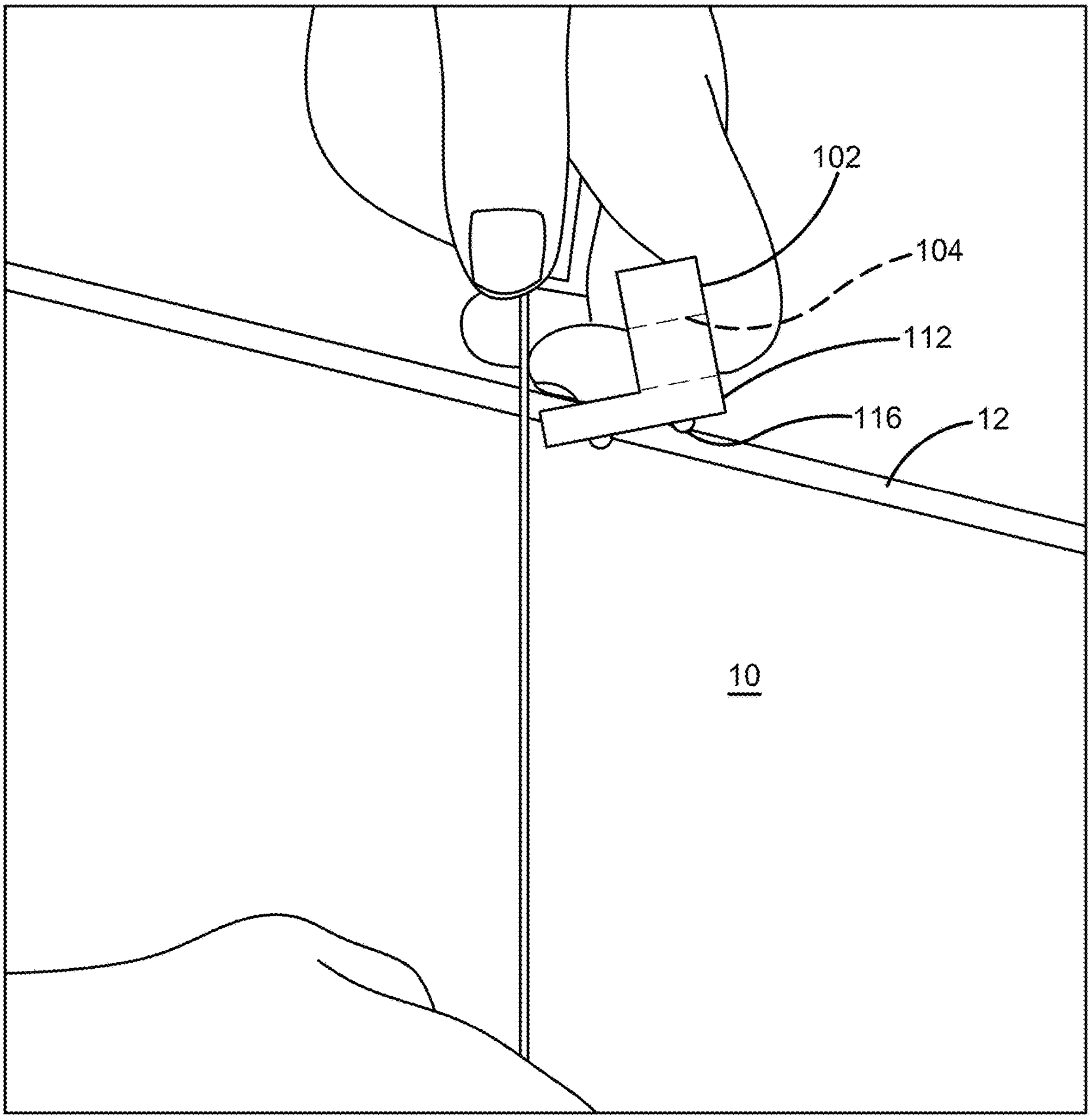
FIG. 3 illustrates a perspective view of one potential embodiment of a sheetrock-cutting finger protection device of the present invention while being used on a board in accordance with the disclosed architecture.

The device 100 is comprised of a main body 102. The body 102 may be a sleeve-like structure shaped to conform to the anatomical contours of at least one human finger. The body 102 may be formed as a closed or partially open loop, and may feature at least one longitudinal opening 104 through which at least one finger may be inserted, as seen in FIG. 3. The body 102 may be fabricated from resilient or semi-rigid materials such as, but not limited to, thermoplastic elastomers (TPE), silicone rubber, polyurethane composites, laminated fabrics reinforced with synthetic fibers, etc. In one embodiment, the body 102 is comprised of an eyelet 103 or other similar mounting structure to allow the device 100 to be attached to a keychain or other securing structure.

The interior surface 106 of the opening 104 may be comprised of a padding layer 108 in one embodiment, as seen in FIG. 1. The padding 108 may be comprised of impact-absorbing or friction-reducing materials such as, but not limited to, closed-cell foam, gel inserts, felted textiles, low-friction polymer linings, etc. Additionally or alternatively, the interior surface 106 and/or padding 108 may be comprised of a surface texture 110 configured to enhance grip, manage perspiration, or increase tactile feedback. The texture 110 may include ridges, dimples, or patterned embossing, such as, but not limited to, micro-ribbing or stippling. In one embodiment, the body 102 may be further comprised of at least one ventilation opening 109. The ventilation opening 109 may be configured as through-holes, slits, or mesh-covered apertures to promote air circulation and reduce moisture accumulation within the opening 104 during extended use.

The body 102 may be integrally or modularly formed with an extension member 112. The extension member 112 may project outwardly from the main body 102 and may be oriented at approximately 90 degrees relative to the longitudinal axis of the body 102 in a preferred embodiment. In alternative configurations, the extension member 112 may be positioned at any angle between 1 and 179 degrees relative to the same longitudinal axis to accommodate different ergonomic or task-specific requirements. The extension member 112 may be comprised of the same material as the body 102 or of a structurally distinct material, such as, but not limited to, rigid or flexible plastics, etc.

Figure 2:
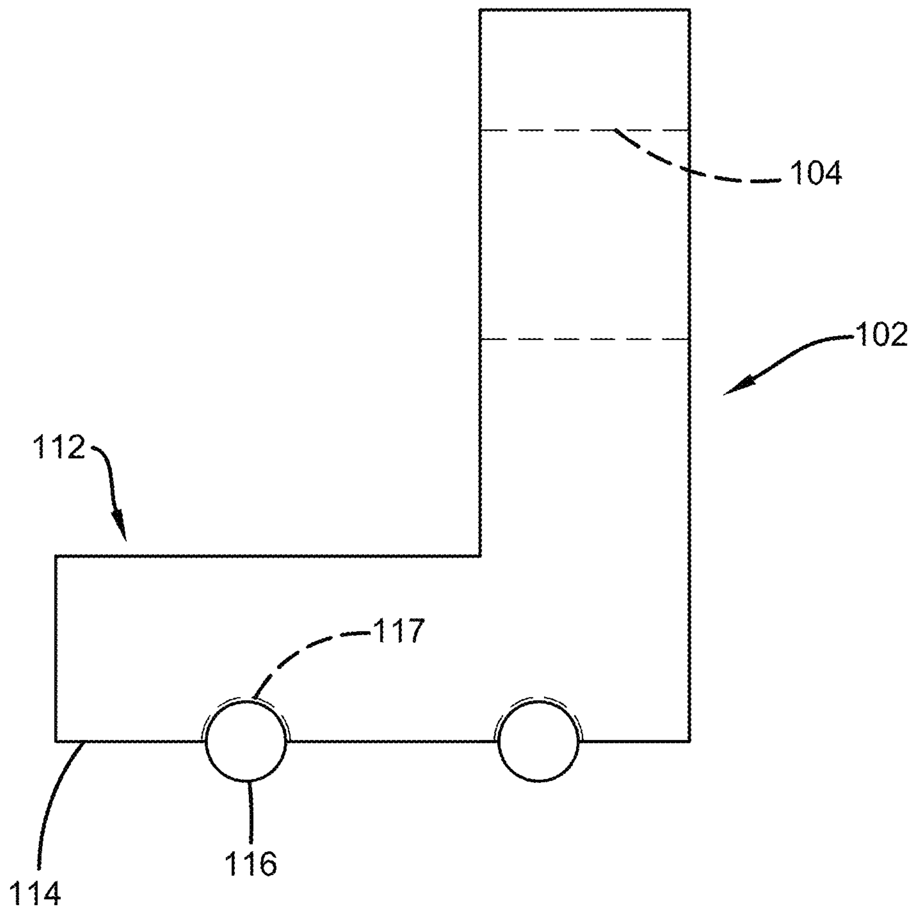
FIG. 2 illustrates a side view of one potential embodiment of a sheetrock-cutting finger protection device of the present invention in accordance with the disclosed architecture.

A bottom surface 114 of the extension member 112 may be comprised of at least one movement element 116 position in any position or orientation, as seen in FIG. 1, FIG. 2, and FIG. 3. The element 116 may facilitate gliding or rolling movement across a work surface (as seen in FIG. 3), thereby reducing friction and enabling controlled navigation during marking or cutting. In a preferred embodiment, the bottom surface 114 may be comprised of two elements 116 oriented parallel to one another and rotatably mounted within recessed channels 117. The elements 116 may be in the form of, but not limited to, bearings, low-friction sliders, rollers, omni-wheels, etc.

In one embodiment, the extension member 112 and/or body 102 may further incorporate a receiving area 118. The receiving area 118 may be comprised of a recessed notch, a contoured slot, an interfacing feature such as, but not limited to, magnetic inserts, elastomeric grips, or alignment rails, etc. The receiving area 118 may be configured to accommodate any contact surface of common construction tools such as a tape measure, utility knife, pencil, or straight edge. This feature may enable the user to stabilize the tool against the device 100 during measurement or cutting, enhancing accuracy and reducing repositioning effort.

Figure 4:
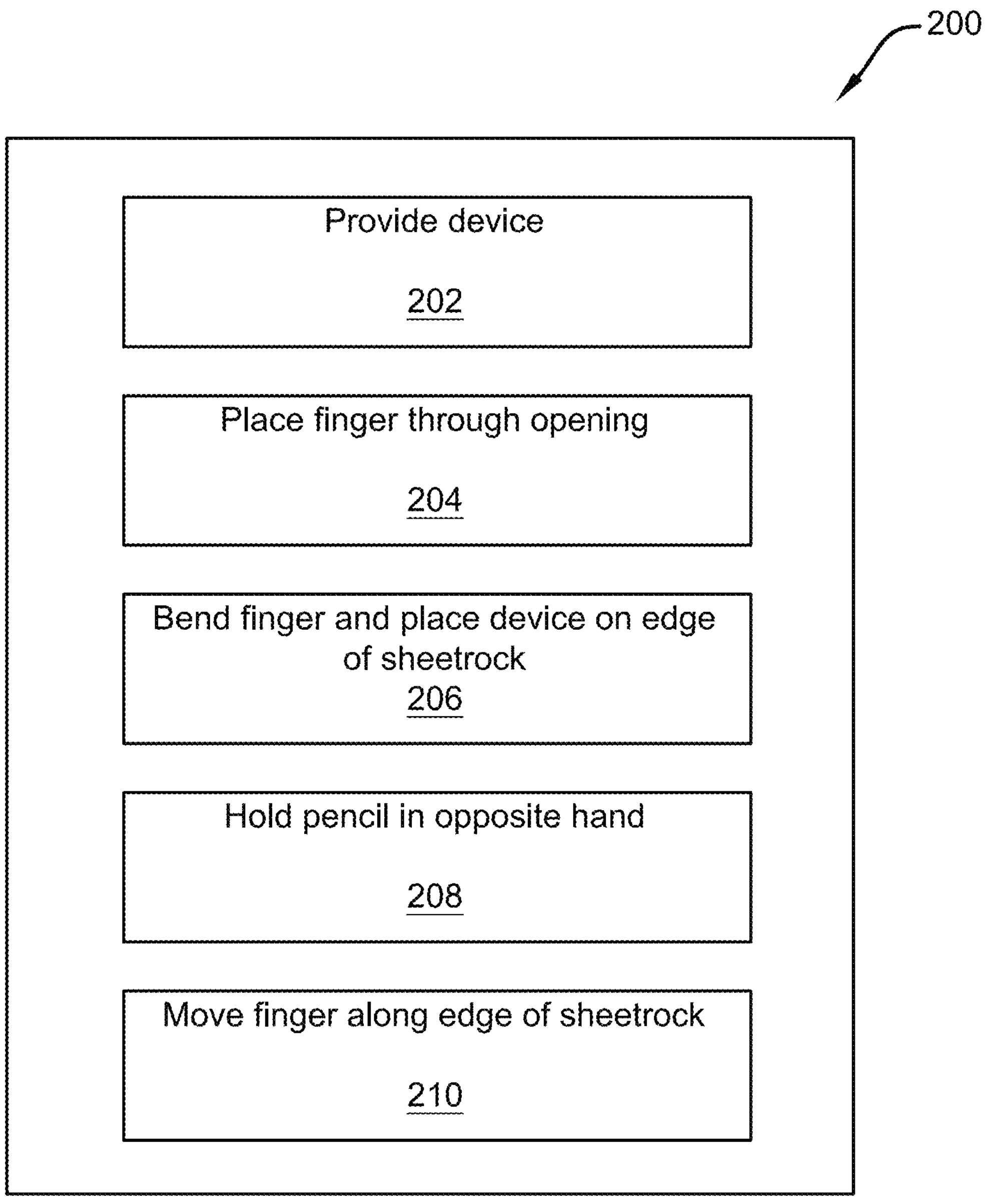
FIG. 4 illustrates a flowchart of a method of using one potential embodiment of a sheetrock-cutting finger protection device of the present invention in accordance with the disclosed architecture.

The present invention is also comprised of a method of using 200 the device 100, as seen in FIG. 4. First, a device 100 is provided comprised of a body 102 comprising at least one longitudinal opening 104 and an extension member 112 comprising at least one bottom surface 114 and at least one movement element 116 [Step 202]. Then, at least one finger of a user is inserted through the longitudinal opening 104 such that the finger passes through the body 102 [Step 204]. Next, the user bends the finger wearing the device 100 at or around 90 degrees and places the bottom surface 114 of the extension member 112 along a top edge 12 of a sheetrock 10 or other board while holding a tape measure in the same hand and positioning the end of the tape measure on an area of the board, as seen in FIG. 3 [Step 206]. Next, a user can hold a pencil held in the opposite hand, wherein the pencil is positioned in alignment with the tape measurement end on the board [Step 208]. Next, a user moves their finger laterally along the top edge of the board via the device 100 such that the movement element 116 facilitates a smooth glide and a mark is made across the board via the pencil while the device 100 maintains consistent guidance along the top edge [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "sheetrock-cutting finger protection device" and "device" are interchangeable and refer to the sheetrock-cutting finger protection device 100 of the present invention.

Notwithstanding the foregoing, the sheetrock-cutting finger protection device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the sheetrock-cutting finger protection device 100 as shown in the FIGS. are for illustrative purposes only, and that many other sizes and shapes of the sheetrock-cutting finger protection device 100 are well within the scope of the present disclosure. Although the dimensions of the sheetrock-cutting finger protection device 100 are important design parameters for user convenience, the sheetrock-cutting finger protection device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A finger protection device while cutting sheetrock and comprising:

a main body comprised of a sleeve like structure having an opening formed longitudinally therethrough for receiving a human finger;

an extension member attached to the main body; and a movement element mounted on a bottom surface of the extension member for facilitating a gliding or rolling movement of the finger protection device across a work surface, wherein the movement element is positioned within a recessed channel and further wherein the extension member houses the movement element.

2. The finger protection device while cutting sheetrock of claim 1, wherein a padding layer is positioned within the opening.

3. The finger protection device while cutting sheetrock of claim 1, wherein a texture layer is positioned within the opening.

4. The finger protection device while cutting sheetrock of claim 1, wherein the main body is comprised of a ventilation opening in addition to the opening.

5. The finger protection device while cutting sheetrock of claim 1, wherein the movement element is comprised of a bearing that turns to facilitate a gliding or rolling movement of the finger protection device across a work surface.

6. The finger protection device while cutting sheetrock of claim 1, wherein the movement element is comprised of a roller that turns to facilitate a gliding or rolling movement of the finger protection device across a work surface.

7. The finger protection device while cutting sheetrock of claim 1, wherein the movement element is comprised of an omni-wheel that turns to facilitate a gliding or rolling movement of the finger protection device across a work surface.

8. A finger protection device while cutting sheetrock and comprising:

a main body comprised of a sleeve like structure having an opening formed longitudinally therethrough for receiving a human finder;

an extension member attached to the main body;

a receiving area; and a movement element mounted on a bottom surface of the extension member and positioned within a recessed channel, wherein the movement member facilitates a gliding or rolling movement of the finger protection device across a work surface.

9. The finger protection device while cutting sheetrock of claim 8, wherein a padding layer is positioned within the opening.

10. The finger protection device while cutting sheetrock of claim 8, wherein a texture layer is positioned within the opening.

11. The finger protection device while cutting sheetrock of claim 8, wherein the main body is comprised of a ventilation opening in addition to the opening.

12. The finger protection device while cutting sheetrock of claim 8, wherein the movement element is comprised of a bearing that turns to facilitate a gliding or rolling movement of the finger protection device across a work surface.

13. The finger protection device while cutting sheetrock of claim 8, wherein the movement element is comprised of a roller that turns to facilitate a gliding or rolling movement of the finger protection device across a work surface.

14. The finger protection device while cutting sheetrock of claim 8, wherein the movement element is comprised of an omni-wheel that turns to facilitate a gliding or rolling movement of the finger protection device across a work surface.

15. The finger protection device while cutting sheetrock of claim 8, wherein the receiving area is comprised of a notch, a slot, a magnetic insert, a grip, or an alignment rail.

* * * * *